United States Patent
Chang

(10) Patent No.: US 11,386,448 B1
(45) Date of Patent: Jul. 12, 2022

(54) METHOD AND SYSTEM FOR INTEGRATION OF BUSINESSES' LOYALTY AND INCENTIVE PROGRAM REWARDS BY DIGITAL CURRENCY—UNIVERSAL COMPLIMENTARY DIGITAL CURRENCY (UCDC) SYSTEM

(71) Applicant: Charles Li Chang, Las Vegas, NV (US)

(72) Inventor: Charles Li Chang, Las Vegas, NV (US)

( * ) Notice: Subject to any disclaimer, the term of this patent is extended or adjusted under 35 U.S.C. 154(b) by 0 days.

(21) Appl. No.: 16/129,341

(22) Filed: Sep. 12, 2018

Related U.S. Application Data

(60) Provisional application No. 62/648,345, filed on Mar. 26, 2018.

(51) Int. Cl.
| | |
|---|---|
| *G06Q 30/02* | (2012.01) |
| *G06Q 20/06* | (2012.01) |
| *H04L 9/32* | (2006.01) |
| *H04L 9/06* | (2006.01) |
| *H04L 9/00* | (2022.01) |

(52) U.S. Cl.
CPC ..... *G06Q 30/0227* (2013.01); *G06Q 20/0655* (2013.01); *G06Q 20/0658* (2013.01); *H04L 9/0637* (2013.01); *H04L 9/3236* (2013.01); *H04L 9/50* (2022.05); *H04L 2209/56* (2013.01)

(58) Field of Classification Search
CPC .......... G06Q 20/0655; G06Q 20/0658; G06Q 20/387; G06Q 30/02; G06Q 30/0207; G06Q 30/0226; G06Q 30/0227; G06Q 30/0228; G06Q 30/0229; G06Q 30/0233; H04L 2209/38; H04L 2209/56; H04L 9/0637; H04L 9/3236

USPC ....................................................... 705/14.28
See application file for complete search history.

(56) References Cited

U.S. PATENT DOCUMENTS

| | | | |
|---|---|---|---|
| 9,251,528 B1 * | 2/2016 | McGhie | G07F 17/3244 |
| 2003/0130895 A1 * | 7/2003 | Antonucci | G06Q 30/0229 705/14.27 |
| 2005/0251446 A1 * | 11/2005 | Jiang | G06Q 20/20 705/14.38 |
| 2006/0248007 A1 * | 11/2006 | Hofer | G06Q 40/12 705/40 |
| 2010/0042517 A1 * | 2/2010 | Paintin | G06Q 40/12 705/30 |
| 2013/0311266 A1 * | 11/2013 | Vichich | G07F 9/001 705/14.27 |
| 2016/0171489 A1 * | 6/2016 | Chiu | G06Q 30/0225 705/14.26 |
| 2017/0344981 A1 * | 11/2017 | Jain | G06Q 20/36 |
| 2017/0364999 A1 * | 12/2017 | Herriger | G06Q 20/065 |
| 2019/0108542 A1 * | 4/2019 | Durvasula | H04L 9/3247 |

FOREIGN PATENT DOCUMENTS

WO   WO-2015016767 A1 *   2/2015   .......... G06Q 20/381

OTHER PUBLICATIONS

Nakamoto, S. "Bitcoin: A Peer-to-Peer Electronic Cash System." Published 2008. <https://bitcoin.org/bitcoin.pdf>. pp. 1-9. (Year: 2008).*

* cited by examiner

*Primary Examiner* — Melvin H Pollack

(57) ABSTRACT

A business reward program integration system providing a digital currency supported by a reserve fund protects consumer members from reward program expiration and eliminates reward program liability for reward program providers.

15 Claims, 2 Drawing Sheets

Initial Integration from Program Rewards to Digital Currency

Figure 1-Initial Integration from Program Rewords to Digital Currency
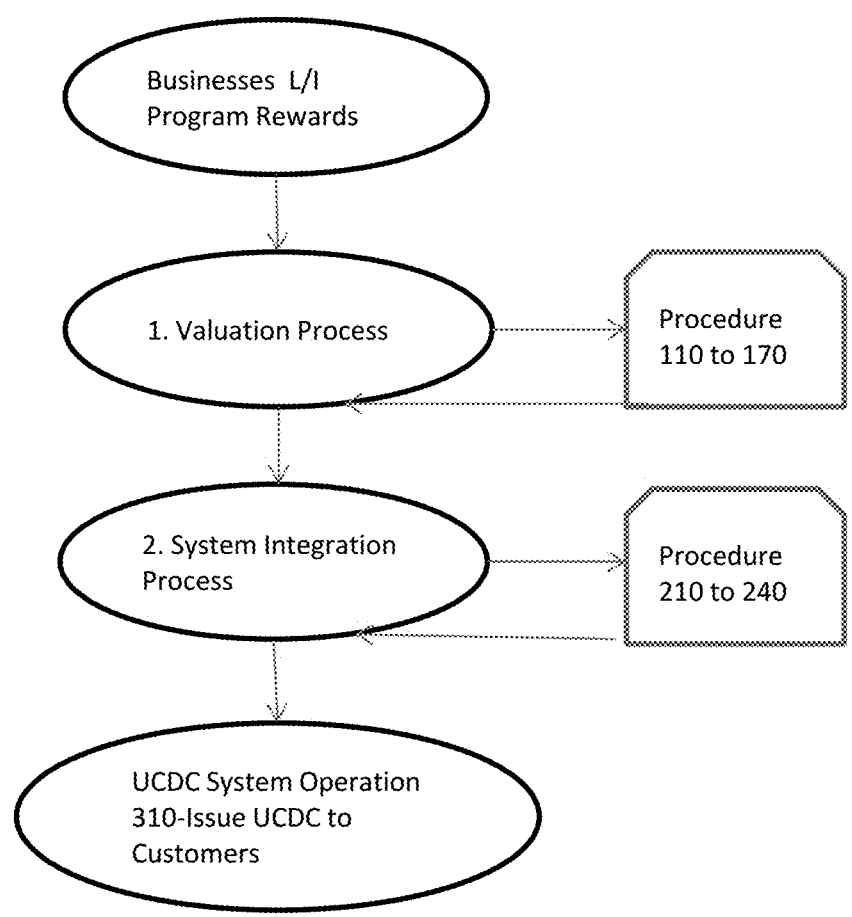

Figure 2- Reserve Fund System and Circulation Process
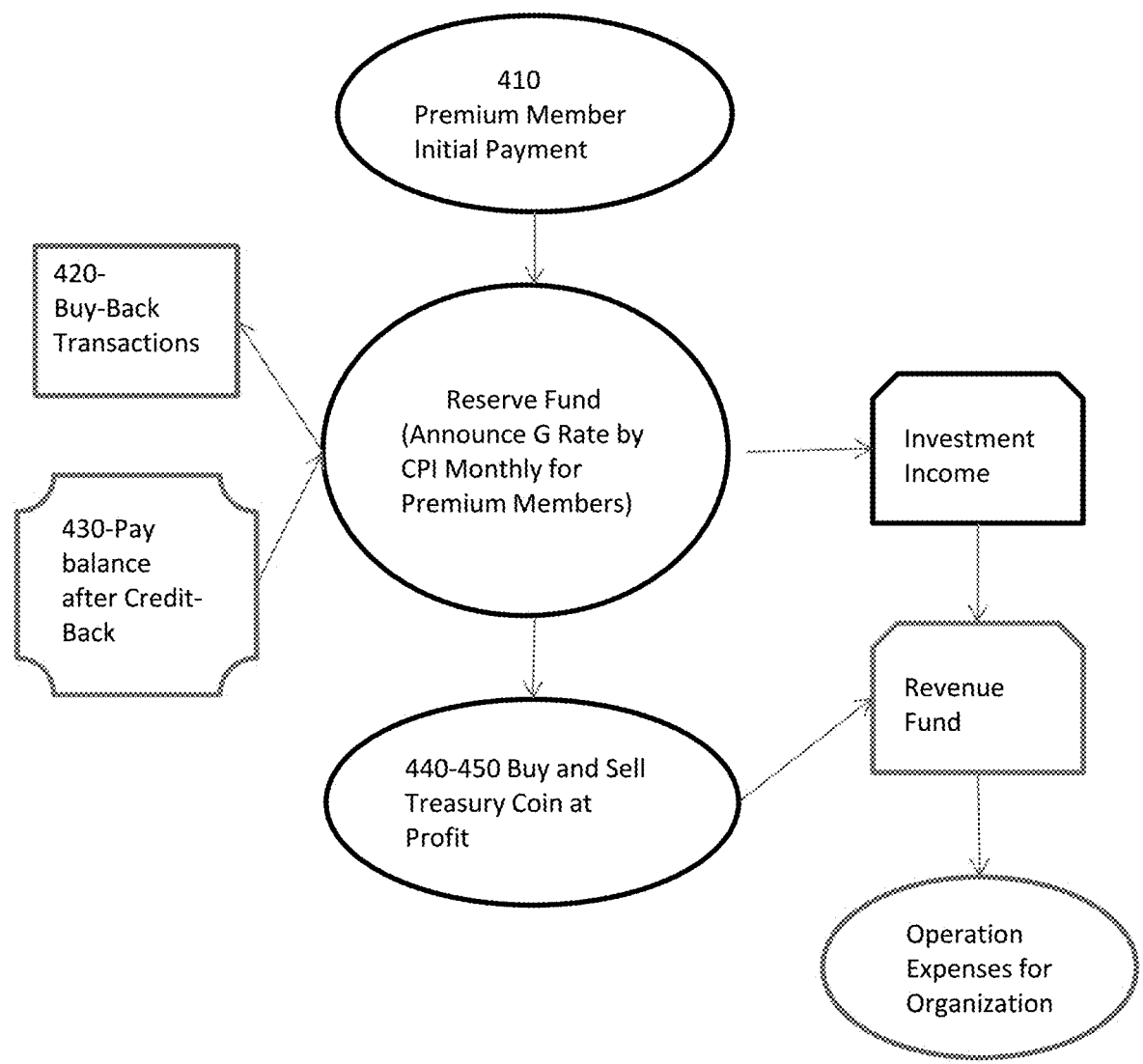

US 11,386,448 B1

METHOD AND SYSTEM FOR INTEGRATION OF BUSINESSES' LOYALTY AND INCENTIVE PROGRAM REWARDS BY DIGITAL CURRENCY—UNIVERSAL COMPLIMENTARY DIGITAL CURRENCY (UCDC) SYSTEM

FIELD OF INVENTION

This invention relates to a system and method for converting loyalty program rewards into digital currency. The disclosed system and method protect consumers and businesses from loyalty program liability, expiration and reduced value.

BACKGROUND OF INVENTION

Currently, most airline companies, hotels, casinos, restaurants, retail stores, credit cards (the businesses) have their own customer loyalty & incentive programs (L&I Program). The businesses usually use POS systems that include loyalty program software to support their L&I program, but some use add-on loyalty program software. If a company has branches or chain stores and allows customers to utilize reward points, mileage, or other complimentary value units (Program Rewards) for all its branches/chain stores, we may call the program an intracompany system.

Some businesses contract with other businesses so their customers can utilize Program Rewards from the other's businesses being called here as contractual joint L&I program an inter-company's system. For example, the airline companies Program Rewards can be redeemed for car rental companies and hotels and vice versa.

However, these program rewards often expire before consumers can benefit from them. For example, in the past decades, some of the businesses filed bankruptcy which wiped out L/I Program liability. Some businesses shorten the Program Rewards' expiration period, and some of them reduce the value of Program Rewards.

SUMMARY OF INVENTION

The present application presents a solution to the aforementioned challenges by providing a Universal Complimentary Digital Currency (UCDC) System. The disclosed system utilizes digital currency to integrate and unify all the reward units of businesses' L/I programs under one system.

The foregoing and other features of the disclosure will become more apparent from the following detailed description of several embodiments, which proceeds with reference to the accompanying figures.

BRIEF DESCRIPTION OF THE FIGURES

FIG. 1 illustrates a flowchart of a method for integrating a business loyalty and royalty program rewards by a Universal Complementary Digital Currency (UCDC) system.

FIG. 2 illustrates a flowchart of a method for receiving funds from the reserve fund system, distributing the funds to the premium members, and generating income.

DETAILED DESCRIPTION OF THE INVENTION

The following explanations of terms and methods are provided to better describe the present disclosure and to guide those of ordinary skill in the art in the practice of the present disclosure.

Customer loyalty/incentive programs: the customer loyalty/incentive programs (L/I Program) are rewards program offered by businesses to customers who frequently make purchases. The Program may give customers complimentary food and beverage, complimentary hotel stays, complimentary airline tickets, free services, free merchandise, reward points, discount coupons, and other benefits for consumers. Such loyalty reward values are set by the businesses and constitute a promise for future consumption and therefore count as current liabilities on the balance sheet for the businesses.

Digital currency: Digital currency (digital money or electronic money or electronic currency) is a type of currency available only in digital form, not in physical form (such as banknotes and coins). It exhibits properties similar to physical currencies, but allows for online transactions and borderless transfer of ownership. Digital currency includes, but is not limited to, virtual currencies, cryptocurrency, and other centralized or decentralized encrypted digital currency. The organization shall choose and maintain the most advanced digital currency technology to ensure all transactions are timely, well recorded and protected. All transaction digital ledgers are encrypted/or block chained, immutable, time stamped, and can be stored both centralized and decentralized.

Valuation process and FE reward value: The valuation process is the process to determine the monetary value of each unit of the reward program (Program Rewards) that the businesses use. The Program Rewards include, but are not limited to, points, mileage, frequency of consumption, and other complimentary units. Subsequently, the monetary value will become the basis to calculate the total reward program liability, and pay the organization's Reserve Fund to issue UCDC for the businesses. Subsequently, the value will be the basis to calculate total Reward Program liability, and pay the organization's Reserve Fund to issue UCDC for the businesses. Ideally, the monetary value will be in between the middle of the product market price and the product cost, and it provides enough incentive to consumers while it will not cause financial burdens to merchants. The UCDC System utilizes the following formulas to provide with a fair estimated monetary value (FE reward value) for the Program Rewards.

110—B reward value=L/I program Liability/total outstanding Program Rewards

120—MP reward value=Standalone Market Price/the amount of reward unit that can be exchanged (redeemed) for the product

121—Standalone Market Price for Multiple products: {Average Sales price of Product 1×(Product 1 Sales amount/total sales amount of all products)+Average Sale price of Product 2×(Product 2 Sales amount/total sales amount of all products) . . . }

122—Standalone Market Price for Single Product: Average Sale Price per Unit

130—FE reward Value=(B reward value×50%+MP reward value×50%). If some businesses' B reward value is more or less than the cost, the above percentage may vary.

140—Quantity of initial issuance for UCDC=MP reward value/nominal value of UCDC×Total outstanding Program Rewards

150—Premium Members' payment=FE reward value× Total outstanding Program Rewards

160—Exchange rate=1: ($1 (nominal value)/MP reward value)

170—The G rate (Buy-back or credit-back guaranty rate) =nominal value×FE reward value/MP reward value.

Hosting organization: The UCDC System hosting organization can be a non-profit organization or for-profit business. The hosting organization's responsibilities includes, but is not limited to, providing UCDC full website services and website security, recruitment, member account management, customers' account management & audit, wallet and payment services, exchange platforms, developments and maintenances of smart phone app., initial public offering (IDCO/ICO), legal and regulatory compliance.

Premium members: The premium members are merchant members who must have an existing L/I Program more than a year before becoming members. The businesses normally have LIT Program liability on their balance sheet. The hosting organization and the businesses shall go through the Valuation process and decide the monetary value of the Program Rewards. Once both parties agree with the value, the businesses will pay in full or promise to pay by installments in full to the organization. The payments will be deposited to UCDC Reserve Fund. Then the hosting organization will issue UCDC to the businesses' customers (according to the distribution list provided by the businesses). The premium members shall provide a timely distribution list to the organization on a pay-as-you-go basis. The monthly payment for the new UCDC issued can be offset (buy-back and credit-back) by the UCDC Premium Members received from the consumers.

General Members: The General Members are merchant members. These are businesses that do not want to convert their Program Rewards to UCDC System or businesses that do not have a L/I Program but want to register and contract with hosting organization to accept UCDC as one of the payments for exchanging their products or services. They also allow selling and buying UCDC through UCDC exchange platform.

Consumer Members: Consumer Members can obtain UCDC from businesses. They can use their account at UCDC online system to use UCDC to purchase merchandise and services. They can buy and sell their UCDC on the UCDC exchange platform. They only need to provide their e-mail address, name, birthday and password to set up accounts with UCDC system. The organization may create membership tiers for its memberships and provide more benefits to the members who have more transactions to use UCDC.

UCDC exchange platforms: UCDC websites that can be bought and sold online at market price. The platforms can be UCDC System owned platforms or other contracted platforms.

UCDC Reserved Fund: UCDC Reserved Fund is the backbone of the UCDC System. The initial fund should be provided by the payments of Premium Members. The payments are not the revenue of the organization but shall be booked as a current liability to the organization. The total circulation of UCDC is based on the fund balance. The fund balance includes, but is not limited to, legal tender, CDs, bonds, and UCDC treasury coin. The fund also provides the minimum market price (The G rate) of UCDC to Premium Members. Nevertheless, the fund provides buy-back and credit-back services for Premium Members. When the market price of UCDC depreciates below the standard set by the organization, the fund shall use its own discretion to buy-back UCDC (become treasury coin) at the exchange platforms to reduce the UCDC circulation. If the market price of UCDC appreciates above standards set by the organization, the fund shall use its own discretion to sell UCDC (treasury coin) at the exchange platforms to increase the UCDC circulation. The fund only maintains three major currencies; those are U.S. Dollars, EURO, and Chinese Yuan. For the security of the UCDC Reserve Fund, investment for the fund can only be in CDs and government bonds with AA rating or above.

Revenue Fund: All incomes generated by the Reserve Fund should be transferred to the revenue fund. The incomes include, but are not limited to interest income, dividend income and Reserve Fund's Premium Members account closing balance. The revenue will be used for operating expenses of the UCDC system.

UCDCIDCO/ICO: UCDC Initial Digital Currency Offering/Initial Coin Offering means by which Premium Members are invited and funds are raised for a new digital currency venture or cryptocurrency venture.

Method and System for Digital Currency

Disclosed herein is a Universal Complimentary Digital Currency (UCDC) System that utilizes digital currency to integrate and unify reward units of businesses' L/I programs under one system.

After the integration and data conversion, the businesses' loyalty program software will only use UCDC as their Program Rewards. The initial public offering (IDCO/ICO) price of UCDC will be $1 (nominal value) in the USA if the patent(s) are approved in the USA first. The UCDC System accepts all local currencies in different countries (according to the currency exchange rate on the transaction date) but the UCDC System's Reserve Fund only keeps U.S. Dollars, EURO, and Chinese Yuan.

The integration and system conversion processes are as follow:

1. Program Rewards Valuation process

UCDC System hosting organization (the organization) shall work with the businesses that already have existing Programs to go through the valuation process. The valuation process is the process to determine the monetary value of each unit of the reward program that the businesses use. The Program Rewards include, but are not limited to, points, mileage, frequency of consumption, and other complimentary units. Subsequently, the monetary value will become the basis to calculate the total reward program liability, and pay the organization's Reserve Fund to issue UCDC for the businesses.

Businesses often use cost basis (price subtract profit margin) to record the total outstanding Program Rewards as current liability on their books.

When a business (the applicant) applies to enroll in the UCDC System, the organization shall first use the amount of the applicant's L/I Program liability divided by the total number of outstanding Program Rewards to get the book value of the reward unit (B reward value). Then the organization shall establish a standalone market product price (the market price) for businesses. The market price considers the most recent year's average price for a single product, the weighted average price for multiple products, price fluctuations in different seasons, and different locations. After the market price is calculated and agreed upon by the business, the market price approach value of the reward unit (MP reward value) can be calculated by the market price divided by the number of reward units that can be exchanged (redeemed) for the product/service (the product).

In most cases, the average of the B reward value and MP reward value shall be the fair estimated value (FE reward value) of the reward unit for the applicant's L/I Program. The FE reward value also will be the base price of Program Rewards that the business pays to the Reserve Fund of the organization when issuing UCDC to the businesses. After the payment, the businesses become Premium Members. Each time UCDC is issued, the payment shall equal FE reward value multiplied by the outstanding Program Rewards.

The nominal exchange rate is equal to the nominal value ($1 in USD) divided by MP reward value. The quantity of issuance for UCDC is the MP reward value multiplied by the total outstanding Program Rewards and then divided by the nominal value of the UCDC.

The buy-back or credit-back guaranty rate (the G rate) of Program Rewards for the initial stage is equal to UCDC nominal value multiplied by the FE rewards value and divided by MP reward value. After the initial stage, the G rate shall be set by the Consumer Price Index (CPI) of the country of the organization issuing UCDC. For example, if the national CPI increased by 2% in February and the government announced the February CPI statistic report on March 10th, the organization shall use the most current G rate multiplied by 102% for the new rate. The organization shall announce the floating G rate on UCDC system website monthly. The maximum amount that the organization can buy-back and credit-back the UCDC from businesses is the businesses' total payments to the Reserve Fund.

The formulas are the followings:

110—B reward value=L/I program Liability/total outstanding Program Rewards

120—MP reward value=Standalone Market Price/the amount of reward unit that can be exchanged (redeemed) for the product 121—Standalone Market Price for Multiple products: {Average Sales price of Product 1×(Product 1 Sales amount/total sales amount of all products)+Average Sale price of Product 2×(Product 2 Sales amount/total sales amount of all products)}

122—Standalone Market Price for Single Product: Average Sale Price per Unit

130—FE reward Value=(B reward value×50%+MP reward value×50%)

If some businesses' B reward value is more or less than the cost, the above percentage may vary.

140—Quantity of initial issuance for UCDC=MP reward value/nominal value of UCDC×Total outstanding Program Rewards 150—Premium Members' payment=FE reward value× Total outstanding Program Rewards 160—Exchange rate=1: ($1 (nominal value)/MP reward value)

170—The initial stage G rate (buy-back or credit-back guaranty rate)=nominal value×FE reward value/MP reward value Example Valuation Process:

S Hotel has 300 of the same room types in California, USA, and the average room rate per night is $200. S Hotel uses S points for its L/I program, and consumer will be rewarded one S point for each $1 spent for the room rate. Consumers need 10,000 S points to redeem a room night. On Mar. 31, 2019, S Hotel has $168,000 in L/I Program liability on the books, and 12 million outstanding S points are in its reward system.

The C System is a non-profit organization in the USA. It launches an a UCDC system on Jan. 2, 2019 in Las Vegas, Nev., and it uses USA E Coin, a cryptocurrency, to unify all Program Rewards. S Hotel and the C System agree the cutoff date to convert S Hotel's Program Rewards to USA E Coin is Mar. 31, 2019. The V process should be as follows:

110—B reward value=L/I Program liability/total outstanding Program Rewards

B reward value=$168,000/12,000,000=$0.014

120—MP reward value=Standalone Market Price/the amount of reward units that can be exchanged (redeemed) for the product (122—Standalone Market Price for Single Product: Average Sale Price per Unit)

MP reward value=$200/10,000=$0.02

130—FE reward Value=B reward value×50%+MP reward value×50%

FE reward Value=0.014×50%+0.02×50%=$0.017

140—Quantity of initial issuance for UCDC=MP reward value/nominal value of UCDC×Total outstanding Program Rewards Quantity of issuance for UCDC=$0.02/$1.00×12M=240,000 Unit 150—Premium Members' payment=FE reward Value× Total outstanding Program Rewards Premium Members' payment=0.017×12M=$204,000

160—Exchange rate=1: ($1 (nominal value)/MP reward value) Exchange rate=1: ($1/$0.02)=1:50

170—The G rate (buy-back or credit-back guaranty rate) =nominal value×FE reward value/MP reward value The G rate=$1×0.017/0.02=$0.85/UCDC Based on the above calculation, S Hotel's payment of its outstanding 12 million S points to the C System's Reserve Fund would be $204,000 ($0.017 12M). The C System should issue 240,000 units of USA E Coin to S Hotel's customers based on the distribution list provided by S Hotel. The G rate in the initial stage is $0.85 per UCDC.

2. System Integration Process

After businesses go through the valuation process (one-by one) with the organization, the businesses negotiate and sign the Premium Members' Agreement with the organization. The organization then performs the system integration process as follows:

210—System Review: This procedure is to understand the capability of the businesses' current loyalty program software. The businesses' loyalty program software could be a built-in function as a part of the POS system or an add-on software from third parties. In most cases, the add-on loyalty program software tends to be more of a turnkey design that would be more flexible than a built in system to produce different reports as needed.

However, the system review will provide more information to decide which jobs of the system integration process can be completed by businesses' loyalty program software and the associated time and cost.

220—Initiate Data Conversion: The data conversion is the procedure to convert customers' information associated with the program rewards they have earned on the cutoff date. The procedures include:

221—Download Customer List: First set up a report format, then download the information from the businesses software. The information of the list includes customers' name, birthday, e-mail address and the balance of Program Rewards.

222—Conversion Table and Distribution List: The organization uses the exchange rate (see procedure 160) to produce conversion tables, then integrate the customers' list with conversion table to the distribution list.

223—Upload data: The organization helps businesses upload the distribution list to the member management function of UCDC system. The distribution list includes customers' name, birthday, e-mail address, and the balance of UCDC.

230—Bridge and Application: After the initial data conversion, the organization shall use the businesses' LIT Program software language to make a bridge software and App to make the distribution list automatically.

240—Parameter set up and Produce Reports: After the initial data conversion, the organization should understand the strengths and weaknesses of businesses' LIT Program software. The organization shall help businesses set up parameter for their LIT program software to produce real-time, weekly, monthly and yearly reports as needed.

3. UCDC System Operation:

310—Issue UCDC to Customers: After the organization receives payments or promissory notes, the organization shall obtain the Program Rewards distribution list provided by businesses to send notifications to the customers that UCDC were issued to their accounts. The notification includes, but is not limited to, the website address, login information, terms and conditions, and user manual to use UCDC. Once customers complete the registration, they become Consumer Members of UCDC System.

310—UCDC Reward Ledger Update: At the initial stage after conversion, the Premium Members may not be available to provide timely updated UCDC reward records (the ledger) to the organization. The premium members shall at least provide the ledger not more than daily (24 hours).

After the initial stage, the organization shall help Premium Members with bridge software which only needs the parameters to be set-up and receive timely updates of the ledger as needed.

321—No Loyalty Reward on UCDC Transactions:

The organization shall suggest that Premium Members not provide any loyalty rewards for consumers that use UCDC to purchase (exchange) their product because the transactions should be treated as redemption of Program Rewards. However, the Premium Members may make the decision by themselves if that would provide more incentives to consumers.

330—General Members Operation and Upgrade:

If the businesses currently do not have any LIT Programs, as most of them may be small to medium-sized businesses, they can become General Members of the UCDC system. They may register with hosting organization to accept UCDC payment for business transaction. They also allow selling and buying UCDC through the UCDC exchange platform. When General Members decide to establish LIT Program and use UCDC as their Program Rewards, they can also apply to upgrade their membership to Premium Membership after one year.

340—Consumer Members:

For the consumers who are currently enrolled in the businesses' LIT Program, once the businesses become Premium Members, the consumers will become Consumer Members of UCDC system, and their original Program Rewards will become UCDC. The Consumer Members can either use UCDC to purchase merchandise and services from all members in the UCDC system or sell UCDC at an exchange platform for legal tender.

350—IDCO/ICO:

Once the organization believes that the system is running smoothly and the legal environment is well established, the organization may also consider starting an Initial Digital Currency Offering or Initial Cryptocurrency Offering to obtain more members.

4. Reserve Fund System and Circulation Process:

410—Once the businesses become Premium Members, the businesses shall pay the Premium Members' payment (as defined in Program Rewards Valuation process) in full or with promissory notes that pay in installments to the UCDC Reserve Fund (the fund). The payments to the Fund are not the revenue of the organization but shall be booked as a current liability to the organization. The organization will record all the transactions for each Premium Member in the UCDC system.

420—On monthly basis, if businesses received UCDC more than they issued, businesses have the option to sell UCDC through UCDC exchange platform or request the organization to buy them (buy-back transaction).

430—If businesses issued UCDC more than they received, businesses can use the amount of UCDC they received as credit (credit-back transaction) and pay the balance in legal tender.

440—When the market price of UCDC depreciates below the standard set by the organization, the fund shall use its own discretion to buy-back UCDC (treasury coin) at the exchange platforms to reduce the UCDC circulation.

450—If the market price of UCDC appreciates above standards set by the organization, the fund shall use its own discretion to sell UCDC (treasury coin) at the exchange platforms to increase the UCDC circulation.

The organization shall use the G Rate for both buy-back and credit-back transactions. The G rate shall be set by CPI of the country of the organization issuing UCDC. The organization shall announce floating G rates on UCDC system website monthly.

The maximum amount that the organization can buy-back and credit-back UCDC from each Premium Member is equal to each Premium Member's total payments to the Reserve Fund.

5. Double-Record Method:

To provide better services, UCDC System shall use both a decentralized system (public ledger) and a centralized system at the same time, which means the UCDC System shall record all transactions in its centralized system. The centralized system shall not only be a back-up record for public ledger but also provide classification and statistical reports for the public.

It should be recognized that illustrated embodiments are only examples of the disclosed system and method and should not be considered a limitation on the scope of the invention. Rather, the scope of the invention is defined by the following claims. I therefore claim as my invention all that comes within the scope and spirit of these claims.

The invention claimed is:

1. A non-transitory computer-readable medium having stored thereon software instructions that, when executed by a processor, cause the processor to generate a universal complementary digital currency for loyalty and incentive reward programs, by executing the steps of:

(i) determining a book value (B value) and a market price value (MP value) for loyalty and incentive reward programs offered by each participating business;

(ii) determining an estimated monetary value (EM value) value for outstanding loyalty and incentive reward program liability for each participating business to be deposited as payment in a universal complementary digital currency reserve fund by the participating business;

(iii) determining a value of universal complementary digital currency (UCDC value) and a quantity (Q) of universal complementary digital currency to be initially issued;

(iv) determining a payment (P) to be deposited by the participating business for the issuance of universal complementary digital currency;

(v) determining a buy-back/credit back guarantee rate (G rate) for the participating business to sell universal complementary digital currency back to the universal complementary digital currency reserve fund;

(vi) converting and integrating customer lists of each participating business into a universal distribution list using the participating business' loyalty program software;

(vii) using the participating business' loyalty program software to produce abridge software and application and make the distribution list automatically;

(viii) evaluating and modifying the participating business' loyalty program software strengths and weaknesses to produce real-time, weekly, monthly and yearly reports as needed; and issuing universal complementary digital currency to customers of each participating business entitled to receive loyalty and incentive rewards from the business, thereby replacing loyalty and incentive reward programs of each participating business with universal complementary digital currency.

2. The non-transitory computer-readable medium of claim 1, wherein the software instructions further causes the processor to apply formulas to determine the values for loyalty and incentive reward programs, outstanding loyalty and incentive reward program liabilities, and buy-back credit guarantee rates.

3. The non-transitory computer-readable medium of claim 2, wherein the formula to determine the B value of loyalty and incentive reward programs of a participating business is:

$$B = \text{(loyalty and incentive reward program liability)}/\text{(total outstanding loyalty and incentive reward program units)},$$

wherein the loyalty and incentive reward program liability is a monetary value owed by the participating business to loyalty and incentive reward program customers; and wherein the total outstanding loyalty and incentive reward program units are reward units owed by the participating business to loyalty and incentive reward program customers.

4. The non-transitory computer-readable medium of claim 2, wherein the formula to determine the MP value of loyalty and incentive reward programs of a participating business is:

$$MP = \text{(Reward product standalone market price)}/\text{(the amount of reward units that can be exchanged (redeemed) for the product)};$$

wherein the standalone market price of a single reward product is the product's most recent average sale price; and wherein the standalone market price for multiple products is the multiple products' most recent cumulative average sale price.

5. The non-transitory computer-readable medium of claim 2, wherein the formula to determine the EM value for outstanding loyalty and incentive reward program liability for each participating business is: $EM = (B \times 50\%) + (MP \times 50\%)$.

6. The non-transitory computer-readable medium of claim 2, wherein the formula to determine the quantity (Q) of universal complementary digital currency to be initially issued is:

$$Q = MP/(\text{UCDC value} \times \text{total outstanding loyalty and incentive reward program units}).$$

7. The non-transitory computer-readable medium of claim 2, wherein the formula to determine the payment (P) to be deposited by the participating business for the issuance of universal complementary digital currency is:

$$P = EM \times \text{(total outstanding loyalty and incentive reward program units)}.$$

8. The non-transitory computer-readable medium of claim 2, wherein the formula to determine the universal complementary digital currency's exchange rate (ER) to a national currency is: $ER = 1 : (\text{UCDC value}/MP)$.

9. The non-transitory computer-readable medium of claim 2, wherein the formula to determine the G rate for universal complementary digital currency generated for outstanding loyalty and incentive reward programs is: $G = (\text{UCDC value} \times EM)/MP$.

10. The non-transitory computer-readable medium of claim 9, wherein the software instructions further cause the processor to determine a floating G rate for the universal complementary digital currency, by performing the steps of determining a consumer price index (CPI) of each country issuing universal complementary digital currency, and setting a floating G rate based on the country's CPI.

11. The non-transitory computer-readable medium of claim 2, wherein the software instructions further cause the processor to determine whether a participating business qualifies as premium member, by executing the step of determining whether the participating business has deposited payment in the universal complementary digital currency reserve fund, prior to generating a universal complementary digital currency for loyalty and incentive reward programs offered by the participating business.

12. The non-transitory computer-readable medium of claim 11, wherein the software instructions further cause the processor to provide premium members with options to buy, sell or exchange universal complementary digital currency by determining whether the premium members have an excess of, or lack universal complementary digital currency, and to keep records of all transactions.

13. The non-transitory computer-readable medium of claim 11, wherein the software instructions further cause the processor to provide the reserve fund with options to buy, sell or exchange universal complementary digital currency by determining appreciation or depreciation of universal complementary digital currency on a timely basis, and by establishing whether there is a need to increase or decrease circulation of universal complementary digital currency, and to keep records of all transactions.

14. The non-transitory computer-readable medium of claim 2, wherein the software instructions further cause the processor to keep record of all transactions, by performing the steps of (a) establishing a crypto-currency public ledger; (b) establishing a centralized universal complementary digital currency system; (c) issuing universal complementary digital currency to customers of participating businesses; (d) issuing crypto-currency to customers of businesses accepting crypto-currency; (e) establishing a conversion system to convert loyalty and incentive reward programs into crypto-currency or universal complementary digital currency; and (f) providing transaction reports.

15. The non-transitory computer-readable medium of claim 2, wherein the loyalty and incentive reward programs comprise one or more of frequent flyer miles, cash back rewards, complimentary food and beverage, complimentary hotel stays, complimentary airline tickets, free services, free merchandise, reward points, and discount coupons.

* * * * *